Patented Sept. 13, 1932

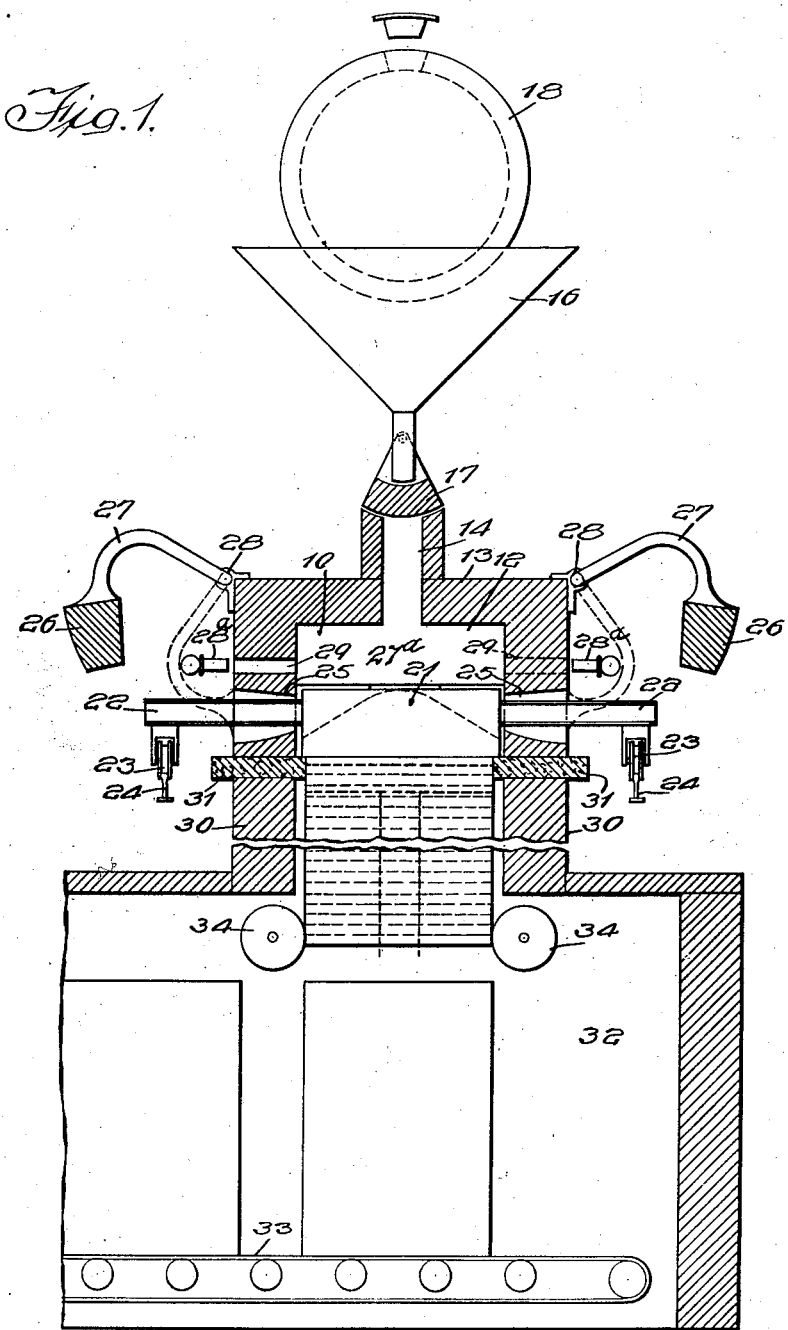

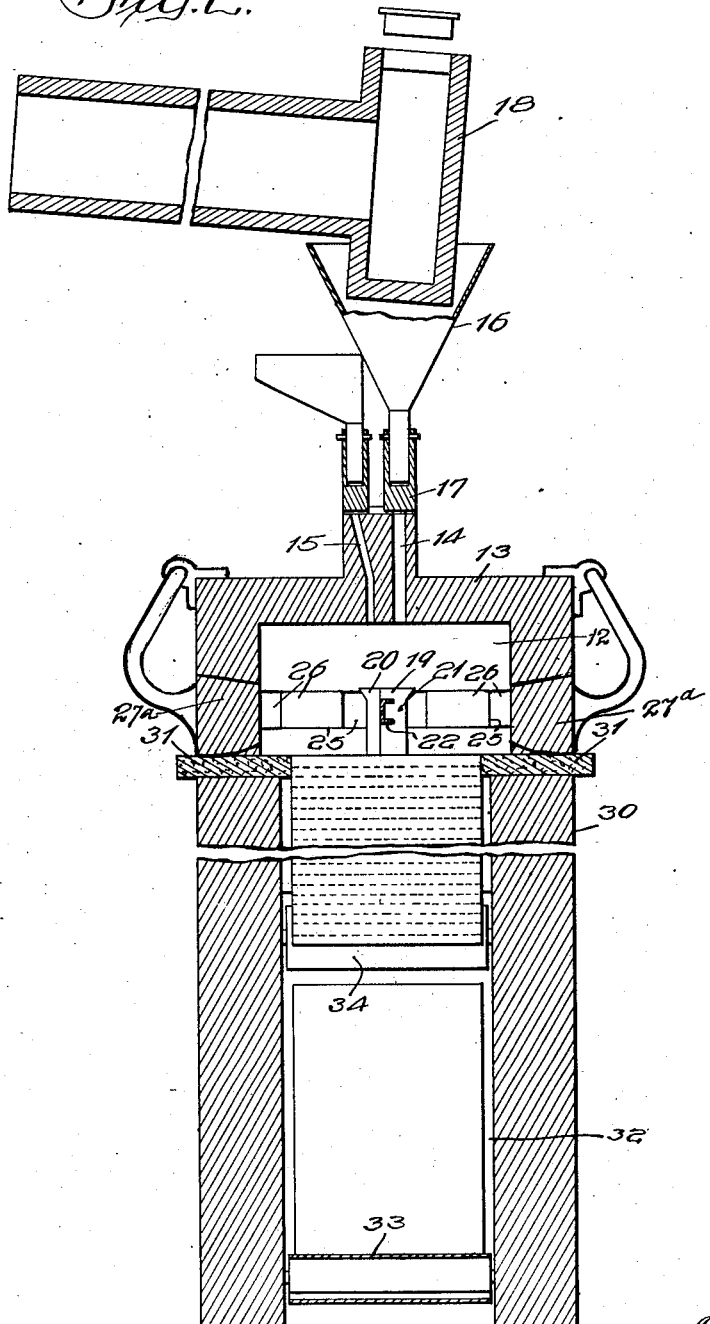

1,877,147

UNITED STATES PATENT OFFICE

KEMPER SLIDELL AND SHERMAN Q. LEE, OF MADISON, WISCONSIN, ASSIGNORS, BY MESNE ASSIGNMENTS, TO AMERICAN FACE BRICK RESEARCH CORPORATION, A CORPORATION OF ILLINOIS

METHOD OF PRODUCING COLUMNS OF BLOATED MATERIAL

Application filed July 21, 1930. Serial No. 469,615.

This invention relates to method of producing columns of bloated material.

In the bloating of argillaceous or other earthy materials, in the production of a cellular product, it has been found that it is desirable to progressively build up a block or column of bloated material by successive deposits of relatively thin layers of granular material and subjecting the layers when deposited to a bloating temperature to cause the bloating thereof and fusion and adherence of the newly deposited material to the body of the column previously formed. This method of bloating by layers or units permits the bloating temperature to be advantageously applied and directed and at the same time permits of a more equal distribution of the temperature throughout the recently deposited layer, so that it will become quickly bloated throughout to the desired degree without danger of over-bloating at the surface which sometimes occurs where the effort is made to bloat layers of excessive depth or thickness.

The present invention is directed to a method of building up a vertically positioned block or column by the deposit of successive strata or layers of granular material at the upper terminus of the column, with a progressive lowering of the completed column through an annealing zone preferably maintained at a soaking temperature which is below the bloating temperature and above the congealing temperature, at which the mass hardens and loses its plastic condition.

The method of the present invention possesses an advantage, in that it permits blocks or columns of large dimensions and of substantially uniform structure to be produced and at the same time permits the operation to be performed in a kiln or furnace of compact dimensions and under conditions which tend to conserve the heat throughout the soaking stage, and until internal strains or stresses within the mass become dissipated.

The method of the present invention furthermore possesses the advantage of permitting the bloating operation to be performed in a chamber of relatively small dimensions, and permits the layers of material to be deposited and spread in the form of accretions having a surface exposure equal only to the cross sectional area of the slab or column with downward feeding of the column as completed, which obviates the necessity for providing horizontally elongated soaking and cooling chambers, which are required where a continuous slab is built up by longitudinal rather than vertical advancement.

In order to better point out the details of the present invention, reference is had to the accompanying drawings, wherein,—

Figure 1 is a diagrammatic sectional elevation of a kiln operating in accordance with the principle of the present invention; and Fig. 2 is a view of the kiln, taken at right angles to the section of Figure 1.

The bloating chamber 10 is provided with side walls 11, end walls 12, and a roof 13, giving to the bloating chamber a boxlike configuration. The roof is provided with a passageway 14 for granular earthy material, and a passageway 15 for sand or other parting material. The granular material is delivered from a chute 16 controlled by a swinging gate 17, and immediately above the chute is located the collecting head 18 of a rotary preheater, which serves to preheat the granular material to a temperature of from 1500° F. to 1800° F., or slightly below the temperature at which the granular particles tend to fuse together and become sticky.

The granular material and sand are respectively delivered in the form of charges of predetermined amount into compartments 19 and 20 of a charger 21, which as shown is carried by a beam 22 provided with rollers 23 running upon rails 24 located on opposite sides of the bloating chamber. The ends of the beam extend outwardly on opposite sides through elongated apertures 25 controlled by door sections 26, which as shown are of wedge shaped formation, each aperture being closed by a plurality of said door sections, which are carried by outwardly bowed arms 27 pivoted at their upper ends 28, which permits the sections to be progressively swung outwardly from the dotted line position to the full line position as the charger beam is moved in depositing a charge of material.

Similar door sections 27ª permit the charger to be withdrawn from the bloating chamber when it has completed the charging operation, so that it will not for long be subjected to the high temperature of the bloating chamber.

The bloating chamber is heated by fuel nozzles 28ª, delivering fuel through ports 29 opening into the upper part of the bloating chamber. The bloating chamber has no permanent hearth, but communicates directly with the upper end of a well 30 which may be of indefinite depth and of equal dimensions with the bloating chamber, and at the point where the well merges into the bloating chamber, the wall is slotted to provide for the insertion of blocks 31 of graphite or other parting material, the inner edges of which blocks protrude inwardly beyond the walls of the bloating chamber and the well or pit, and serve to give definition to the edges of the deposited layers of granular material, and at the same time are so mounted that they may be moved inwardly from time to time in order to compensate for wear caused by contact with the bloating material.

The bottom of the charger 21 moves in close proximity to the edges of the parting blocks 31 and deposits a comparatively thin layer of granular material within the space surrounded by the edges of the parting blocks. Below the lower end of the well or pit 30, which constitutes a soaking chamber, is located a cooling chamber 32 provided near its floor with a continuous conveyor 33 adapted to convey the completed blocks of material by slow degrees through the cooling chamber, where they are permitted to cool gradually until reduced to room temperature. A pair of rollers 34 are provided immediately below the lower end of the well, which serve to lower the completed column of material after the same has been built up to a length slightly in excess of the depth of the well.

Operation

At the beginning of the bloating operation, when the kiln is first put into service, it will be necessary to provide a temporary hearth or floor for the initial building up of the first column of bloated material. This temporary hearth, as shown in dotted lines in Figure 1, may be in the form of a plunger operating within the well and having an upper surface of suitable dimensions to coincide with the space subtended within the inner edges of the parting blocks 31.

The plunger is first elevated to bring its surface to a level somewhat below the upper marginal surfaces of the parting blocks 31, which thus constitute the side walls of a form for the deposit of the granular material. Thereafter, the charger is moved into position beneath the chutes 14 and 15 and receives measured charges of granular material and parting material such as sand into the respective compartments 19 and 20. With the charger thus charged, it is moved across the surface of the plunger and deposits first a thin layer of parting material, and above this layer a charge of granular material, which is leveled down by the passage of the charger flush with the upper surface of the parting blocks 31. The bloating then proceeds, and the deposited layer of material bloats and expands above the surface of the parting blocks, and after the bloating of the first layer has been completed, the plunger will be slightly lowered to bring the bloated surface of the first layer below the margins of the parting blocks, after which a second layer of granular material will be deposited directly upon the surface of the first bloated layer, without the intervention of a layer of sand, so that the second layer will fuse and coalesce with the first layer in the building up of an integral block without joints or laminations.

Succeeding layers will be thus deposited and fused together, and the temporary plunger will be progressively lowered until a block has been built up of sufficient height to fill the well and come into contact with rollers 34, and thereafter the use of the temporary plunger may be dispensed with, and the block itself will be supported by the pressure of the rollers and will serve the function previously performed by the plunger in supporting the column as successive layers are deposited upon the upper end thereof.

In order to divide the column into sections of predetermined length, it is desirable, after a column has been built up to the desired length, to charge a layer of sand across the upper end of the column in the formation of a joint, so that thereafter, when the next layer of granular material is deposited, it will not adhere to the surface, but will begin the formation of a new column or block which will be progressively fed downwardly and supported by the previously formed block or column, which will be engaged by the rollers, and supported until it has been fed downwardly to a position below the rollers, at which time it will be released therefrom and deposited upon the endless conveyor 33, which serves to convey it in a lateral direction away from the bottom of the well to make room for the descent of the next column of material. In this way each block or column in turn will serve as a support for the building up of the succeeding column, so that after the kiln has once been set in operation it will no longer be necessary to make use of the temporary expedient afforded by the plunger.

After the bloating of each layer, the column will be fed downwardly by the rollers sufficiently to bring its upper end surface to a proper level below the upper surface of the parting blocks 31 so that a shallow form or mold will be afforded for the reception of a new charge of granular material. At the same time, the formation of the well, having walls of heat resistant and heat insulating material, serves to conserve the heat sufficiently to allow a thorough soaking of the mass at a temperature but slightly below the bloating temperature, which permits the internal strains and stresses to be dissipated and delivers the block to the cooling chamber in proper condition for transporting to another portion of the cooling chamber, where it may be cooled at a rate sufficiently gradual to prevent internal shattering due to a sudden diminution of temperatures.

The invention is one which is particularly applicable in the building up of large blocks or columns of considerable cross sectional area, since the relatively thin layers or deposits of granular material will be uniformly bloated throughout and will coalesce and integrally unite with the block, with the result that a large mass may be produced having a substantially uniform texture throughout.

We claim:

1. The method of producing columns of bloated material, which consists in depositing a layer of granular earthy material, subjecting the layer to a bloating temperature to cause fusion of the particles and expansion thereof by bloating into a cellular block, lowering the bloated block a distance equal to the thickness of the block after bloating, depositing a second layer of granular material on the surface of the first layer so bloated, and subjecting the second layer to a bloating temperature to cause expansion by bloating thereof and fusion with the first bloated layer.

2. The method of producing columns of bloated material, which consists in depositing a layer of granular earthy material, subjecting the layer to a bloating temperature to cause fusion of the particles and expansion thereof by bloating into a cellular block, lowering the bloated block a distance equal to the thickness of the block after bloating, depositing a second layer of granular material on the surface of the first layer so bloated, and subjecting the second layer to a bloating temperature to cause expansion by bloating thereof and fusion with the first bloated layer, and in recurrently depositing succeeding layers and intermittently lowering the column in each instance a distance required to bring the upper surface thereof into the same position to receive the deposit of the next succeeding layer.

3. The method of producing columns of bloated material, which consists in depositing a layer of granular material, subjecting the layer to a bloating temperature to produce bloating thereof, lowering the bloated layer, depositing a second layer of granular material upon the surface of the first layer, and subjecting the second layer to a bloating temperature to cause bloating thereof and fusion with the first layer, and in recurrently depositing succeeding layers and intermittently lowering the column in each instance to bring the upper surface thereof into position to receive the deposit of the next succeeding layer, and in recurrently depositing a parting medium upon the upper surface of the column to divide the column into separable sections of the desired length.

4. The method of producing columns of bloated material, which consists in depositing a layer of granular material, subjecting the layer to a bloating temperature to produce bloating thereof, lowering the bloated layer, depositing a second layer of granular material upon the surface of the first layer, and subjecting the second layer to a bloating temperature to cause bloating thereof and fusion with the first layer, and in recurrently depositing succeeding layers and intermittently lowering the column in each instance to bring the upper surface thereof into position to receive the deposit of the next succeeding layer, and in recurrently depositing a parting medium upon the upper surface of the column to divide the column into separable sections of the desired length, and in supporting each section of the column during its formation upon the previously completed section.

5. The method of producing columns of bloated material, which consists in depositing a layer of granular earthy material, subjecting the layer to a bloating temperature to cause fusion of the particles and expansion thereof by bloating into a cellular block, lowering the bloated block a distance equal to the thickness of the block after bloating, and into a zone maintained at a soaking temperature, depositing a second layer of granular material on the surface of the first layer so bloated, and subjecting the second layer to a bloating temperature to cause expansion by bloating thereof and fusion with the first bloated layer.

6. The method of producing columns of bloated material, which consists in depositing a layer of granular earthy material, subjecting the layer to a bloating temperature to cause fusion of the particles and expansion thereof by bloating into a cellular block, lowering the bloated block a distance equal to the thickness of the block after bloating, and into a zone maintained at a soaking temperature, depositing a second layer of granular material on the surface of the first layer so bloated, and subjecting the second layer to a bloating temperature to cause expansion by bloating thereof and fusion with the first bloated layer, and in recurrently depositing succeeding layers and intermittently lowering the column in each instance a distance required to bring the upper surface thereof into the same position to receive the deposit of the next succeeding layer.

7. The method of producing columns of bloated material, which consists in depositing a layer of granular material, subjecting the layer to a bloating temperature to produce bloating thereof, lowering the bloated layer into a zone maintained at a soaking temperature, and depositing a second layer of granular material upon the surface of the first layer, and subjecting the second layer to a bloating temperature to cause bloating thereof and fusion with the first layer, and in recurrently depositing succeeding layers and intermittently lowering the column in each instance to bring the upper surface thereof into position to receive the deposit of the next succeeding layer, and in recurrently depositing a parting medium upon the upper surface of the column to divide the column into separable sections of the desired length.

8. The method of producing columns of bloated material, which consists in depositing a layer of granular material, subjecting the layer to a bloating temperature to produce bloating thereof, lowering the bloated layer into a zone maintained at a soaking temperature, and depositing a second layer of granular material upon the surface of the first layer, and subjecting the second layer to a bloating temperature to cause bloating thereof and fusion with the first layer, and in recurrently depositing succeeding layers and intermittently lowering the column in each instance to bring the upper surface thereof into position to receive the deposit of the next succeeding layer, and in recurrently depositing a parting medium upon the upper surface of the column to divide the column into separable sections of the desired length, and in supporting each section of the column during its formation upon the previously completed section.

9. The method of producing integral columns of bloated cellular material, which consists in depositing a first layer of granular earthy material within a definitely dimensioned space defined by a laterally surrounding parting medium, subjecting the layer thus deposited to a bloating temperature to cause expansion by bloating thereof within the confines of the parting medium, lowering the bloated layer to provide an unoccupied space within the confines of the parting medium for the reception of a second deposit of granular material, and depositing and bloating a second layer upon the surface of the first bloated layer under conditions insuring fusion thereof with the first bloated layer, and in successively lowering and in like manner depositing and bloating succeeding layers in the formation of an integral column.

10. The method of producing integral columns of bloated cellular material, which consists in depositing a first layer of granular earthy material within a definitely dimensioned space defined by a laterally surrounding parting medium, subjecting the layer thus deposited to a bloating temperature to cause expansion by bloating thereof within the confines of the parting medium, lowering the bloated layer into a soaking zone to eliminate internal strains and to provide an unoccupied space within the confines of the parting medium for the reception of a second deposit of granular material and depositing and bloating a second layer upon the surface of the first bloated layer under conditions insuring fusion thereof with the first bloated layer, and in successively lowering and in like manner depositing and bloating succeeding layers in the formation of an integral column.

11. The method of producing columns of bloated material, which consists in depositing a first layer of granular material within a space surrounded by a parting medium, subjecting the layer thus deposited to a bloating temperature to cause bloating thereof, lowering the bloated layer to provide space within the confines of the parting medium for the reception of a second deposit of granular material, and depositing and bloating a second layer upon the surface of the first bloated layer, and in successively lowering and in like manner depositing and bloating succeeding layers, the progressively forming column being progressively lowered through a soaking zone to subject the mass to a soaking temperature to eliminate internal strains, and in recurrently depositing a layer of sand over a previously bloated layer of granular material to furnish a joint for dividing the column into sections.

12. The method of producing a continuous column of bloated material, which consists in introducing a charge of granular material within the confines of a surrounding parting medium and leveling down the surface of the granular material to the surface of the parting medium, subjecting the layer of granular material thus deposited to a bloating temperature to bloat the same, lowering the layer when bloated to afford space within the parting medium for the reception of a succeeding charge of material, and in introducing, leveling down and bloating such succeeding charge.

13. The method of producing a continuous column of bloated material, which consists in introducing a charge of granular material within the confines of a surrounding parting medium and leveling down the surface of the granular material to the surface of the parting medium, subjecting the layer of granular material thus deposited to a bloating temperature to bloat the same, lowering the layer when bloated to afford space within the parting medium for the reception of a succeeding charge of material, and in introducing, leveling down and bloating such succeeding charge, and in continuing by like operations the building up of a continuous column and progressively lowering the column into and through a soaking zone.

14. The method of producing a continuous column of bloated material, which consists in introducing a charge of granular material within the confines of a surrounding parting medium and leveling down the surface of the granular material to the surface of the parting medium, subjecting the layer of granular material thus deposited to a bloating temperature to bloat the same, lowering the layer when bloated to afford space within the parting medium for the reception of a succeeding charge of material, and in introducing, leveling down and bloating such succeeding charge, and in continuing by like operations the building up of a continuous column and progressively lowering the column into and through a soaking zone, and in recurrently dividing the column to produce separable sections.

In witness that we claim the foregoing we have hereunto set our hands this 11th day of July, 1930.

KEMPER SLIDELL.
SHERMAN Q. LEE.